(12) United States Patent
Dille

(10) Patent No.: US 7,104,275 B2
(45) Date of Patent: Sep. 12, 2006

(54) PINCH VALVE

(75) Inventor: Joseph C Dille, Telford, MO (US)

(73) Assignee: Emerson Electric Co., St. Louis, MO (US)

( * ) Notice: Subject to any disclaimer, the term of this patent is extended or adjusted under 35 U.S.C. 154(b) by 232 days.

(21) Appl. No.: 10/605,385

(22) Filed: Sep. 26, 2003

(65) Prior Publication Data

US 2004/0112436 A1    Jun. 17, 2004

Related U.S. Application Data

(63) Continuation-in-part of application No. PCT/US03/09381, filed on Mar. 28, 2003.

(60) Provisional application No. 60/369,493, filed on Apr. 1, 2002.

(51) Int. Cl.
*G05D 7/06* (2006.01)
*F16K 7/06* (2006.01)

(52) U.S. Cl. ............... 137/487.5; 137/486; 251/7; 251/48; 251/337

(58) Field of Classification Search ............ 137/486, 137/487.5; 251/4, 5, 6, 7, 8, 48, 227, 337
See application file for complete search history.

(56) References Cited

U.S. PATENT DOCUMENTS

| | | | | |
|---|---|---|---|---|
| 2,588,212 A | * | 3/1952 | Custer ........................ | 251/5 |
| 2,674,435 A | | 4/1954 | Angell | |
| 3,511,469 A | * | 5/1970 | Bell .......................... | 251/7 |
| 4,259,985 A | | 4/1981 | Bergmann | |
| 4,548,382 A | | 10/1985 | Otting | |
| 4,895,341 A | * | 1/1990 | Brown et al. ............... | 251/8 |
| 5,078,361 A | * | 1/1992 | Nordman ..................... | 251/7 |
| 5,190,071 A | * | 3/1993 | Sule ........................ | 137/595 |
| 5,379,790 A | | 1/1995 | Bruce et al. | |
| 5,810,324 A | | 9/1998 | Eriksson et al. | |
| 5,816,445 A | * | 10/1998 | Gardos et al. ............... | 222/1 |
| 6,036,166 A | | 3/2000 | Olson | |
| 6,120,001 A | * | 9/2000 | Donahue ..................... | 251/4 |
| 6,279,869 B1 | | 8/2001 | Olewicz | |
| 6,340,096 B1 | * | 1/2002 | Zerfas ........................ | 222/1 |
| 6,536,738 B1 | * | 3/2003 | Inoue et al. ................ | 251/5 |
| 2001/0019117 A1 | | 9/2001 | Schoeb | |

(Continued)

FOREIGN PATENT DOCUMENTS

GB      1321199 A     6/1973

OTHER PUBLICATIONS

International search report for Application No. PCT/US2004/031702, Dec. 17, 2004.

(Continued)

*Primary Examiner*—Ramesh Krishnamurthy
(74) *Attorney, Agent, or Firm*—Locke Liddell & Sapp LLP

(57) ABSTRACT

A control valve includes an elastomeric flow tube, a plunger having first and second ends, and a pinch member connected to the first end of the plunger. The pinch member is situated adjacent the flow tube. A reference surface is positioned generally opposite the pinch member such that the elastomeric tube is squeezable between the pinch member and the reference surface to control fluid flow through the flow tube. A first guide spring is situated between the pinch member and the first end of the plunger, and a second guide spring is situated adjacent the second end of the plunger. A damper may be connected to the plunger. Further, a pressure containing member may situated about at least a portion of the flow tube.

25 Claims, 8 Drawing Sheets

U.S. PATENT DOCUMENTS

2003/0097884 A1* 5/2003 Sund et al. ............ 73/861.355
2003/0098069 A1 5/2003 Pawlas et al.
2003/0141470 A1 7/2003 Igarashi
2004/0163711 A1* 8/2004 Varone et al. .............. 137/486

OTHER PUBLICATIONS

International search report for Application No. PCT/US03/09381, Jul. 28, 2004.

* cited by examiner

PINCH VALVE

CROSS REFERENCE TO RELATED APPLICATIONS

This application is a continuation-in-part of International Patent Application No. PCT/US03/09381, filed Mar. 28, 2003, which designates the United States of America and claims priority to U.S. Provisional Patent Application No. 60/369,493, filed Apr. 1, 2002. Both of these applications are incorporated by reference.

BACKGROUND OF THE DISCLOSURE

1. Field of the Disclosure

The present invention relates generally to fluid flow and control, and more particularly, to a pinch valve having a reduced-friction guide mechanism.

2. Description of Related Art

A fluid flow control system generally consists of three components: a flow sensor, a control valve and a controller such as a proportional-integral-derivative (PID) controller. A typical fluid flow control system functions by changing the amount of opening of the control valve until the flow sensed by the flow sensor matches the desired, or set point flow. Often, the control valve must be adjusted by very small amounts to achieve the desired closeness of control.

Many industries such as semiconductor, pharmaceutical, and bio-technology experience fluid control problems due to the typically low flow rates, the use of abrasive chemical fluids, the use of corrosive chemical fluids, and the need for contaminant free, accurate, compact, and real-time fluid control and delivery systems.

For example, Chemical-Mechanical Planarization (CMP) is a critical process in the semiconductor industry that involves a process to flatten the wafer surface of a semiconductor by applying an ultra-pure fluid containing suspended solid particles and a reactive agent between the wafer surface and a polishing pad. In most applications, the polishing pad rotates at a controlled speed against the semiconductor to flatten the surface. Over-polishing the wafer can result in altering or removing critical wafer structures. Conversely, under-polishing of the wafer can result in unacceptable wafers. The polishing rate of the wafer is highly dependent upon the delivery rate of the fluid and the total amount of fluid delivered during a polishing operation.

Another process used in the semiconductor industry requiring accurate control of fluid flows and a contaminant free environment is the photolithography process. As is known in the art, photolithography is a process that applies a light sensitive polymer, known as resist, or photo resist, to the wafer surface. A photomask containing a pattern of the structures to be fabricated on the wafer surface is placed between the resist covered wafer and a light source. The light reacts with the resist by either weakening or strengthening the resist polymer. After the resist is exposed to light the wafer is developed with the application of fluid chemicals that remove the weakened resist. Accurate and repeatable resist delivery is essential to properly transfer the pattern. The resist must be contamination free as any dirt on the surface will cause a defect in the final pattern.

A modification of this process applies a host of new liquids to the wafer surface to create films that will become an integral part of the final semiconductor. The primary function of these films is to act as an insulator between electrical conducting wires. A variety of spin-on materials are being evaluated with a wide variety of chemical compositions and physical properties. The key difference between the lithography process and the spin-on deposition is that any defect in the film (such as a void, bubble or particle) is now permanently embedded in the structure of the semiconductor and could result in non-functioning devices and a financial loss for the semiconductor producer.

Both of these processes take place in a tool called a track. The purpose of the track is to apply a precise volume of fluid to the surface of a stationary or slowly spinning wafer. Additional chemical processing steps may be used to convert the liquid to the proper structure. After the liquid application, the wafer rotation speed is rapidly increased and the liquid on the wafer surface is spun off the edge. A very thin, consistent thickness of liquid remains from the center of the wafer to the edge. Some of the variables that affect liquid thickness include the resist or dielectric viscosity, solvent concentration in the resist or dielectric, the amount of resist/dielectric dispensed, speed of dispense, etc.

The track will also provide additional processing steps after liquid application that changes the liquid to a polymer using a bake process that also removes any solvent in the film. The track also controls the environment around the wafer to prevent changes in humidity or temperature and chemical contaminants from affecting the performance of the film. Track system performance is determined by the accuracy and repeatability of liquid delivered to the wafer surface in addition to minimizing defects in the film caused by voids, bubbles and particles.

The fluid control element is thus a critical component of such systems to insure proper delivery of the process fluids. A pinch valve may be used for the fluid control valve in such systems to provide an efficient, compact and high purity fluid control device. In particular, a solenoid-actuated pinch valve provides a cost-effective means for providing fine fluid control. Such valves typically have a guide mechanism that incorporates parts that slide against each other. With any sliding mechanism there is a finite amount of friction. Even if the sliding parts are made up of low friction materials, there will still be some friction. This friction can result in a stick-slip motion of the pinch valve, impacting the precision of flow control.

The present application addresses shortcomings associated with the prior art.

SUMMARY OF THE DISCLOSURE

In accordance with aspects of the present disclosure, a control valve includes an elastomeric flow tube, a plunger having first and second ends, and a pinch member connected to the first end of the plunger. The pinch member is situated adjacent the flow tube. A reference surface is positioned generally opposite the pinch member such that the elastomeric tube is squeezable between the pinch member and the reference surface to control fluid flow through the flow tube. A first guide spring is situated between the pinch member and the first end of the plunger, and a second guide spring is situated adjacent the second end of the plunger. The guide springs may be flat disks defining a spiral slots therethrough.

An actuator receives the plunger so that it can be adjusted to selectively position the pinch member relative to the reference surface, allowing fine flow control. A plunger extension is received by the plunger such that one end extends from the plunger and abuts the first guide spring. The other end of the plunger extension extends from the plunger and abuts the second guide spring.

In certain exemplary embodiments, a damper is connected to the plunger. The damper has a first member defining an opening therein and a second member slidably received in the opening such that there is clearance between the first and second members to create an air passage. The second member of the damper may be a spring cup having an opening therethrough, with a spring retainer situated next to the spring cup opening. A preload spring extends through the spring cup opening and is seated in the spring retainer. Further, a pressure containing member may situated about at least a portion of the flow tube.

In other aspects of the disclosure, a flow measurement and control device uses a control valve as described herein. For example, the flow measurement and control device includes an enclosure with a flow measurement device situated in the enclosure. An elastomeric flow tube is in fluid communication with the flow measurement device. A plunger has a pinch member connected thereto, which is situated adjacent the flow tube. A reference surface is positioned generally opposite the pinch member such that the elastomeric tube is squeezable between the pinch member and the reference surface to control fluid flow through the flow tube. A first guide spring is situated between the pinch member and the first end of the plunger, and a second guide spring is situated adjacent the second end of the plunger.

A controller receives a measurement output signal from the flow measurement device and provides a control output signal to the pinch valve in response to a setpoint signal and the measurement output signal to adjust the pinch member relative to the reference surface to control fluid flow through the flow tube as necessary to reduce any error between the measured flow and the setpoint flow. In certain embodiments, the flow measurement device is a Coriolis mass flow measurement device.

BRIEF DESCRIPTION OF DRAWINGS

Other objects and advantages of the invention will become apparent upon reading the following detailed description and upon reference to the drawings in which.

Figure 1:
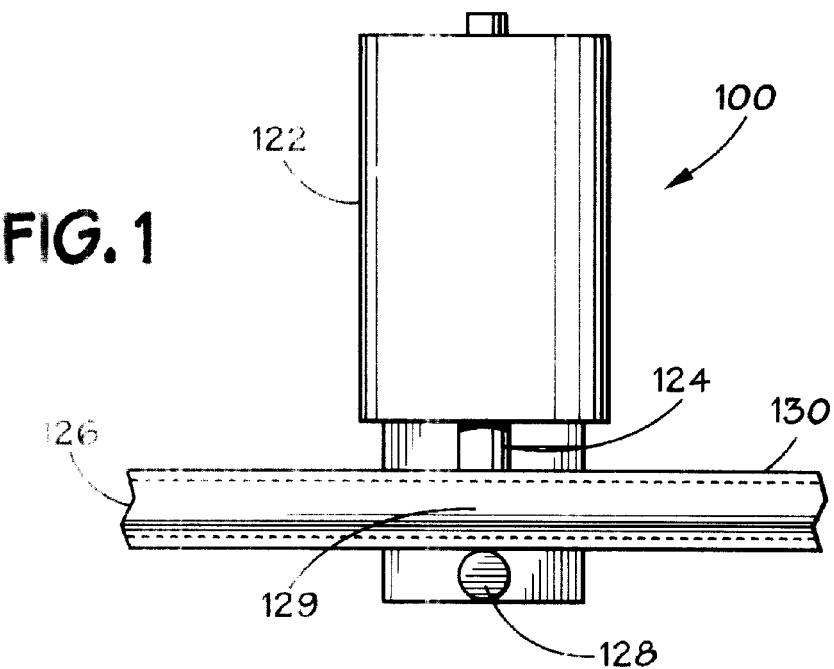
FIG. 1 is a block diagram schematically illustrating a pinch valve in accordance with an exemplary embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A pinch valve 100 in accordance with an embodiment of the present invention is conceptually illustrated in FIG. 1. An actuator 122 is situated next to an elastomeric tube 126. A valve plunger 124, which may be in the form of a piston or ram, is moved by the actuator 122 to selectively squeeze or pinch the tube 126 against a reference surface 128, thus varying the size of the opening through which fluid flows 129. The flow tube 126 is made of material that is relatively soft so that it can be compressed between the plunger 124 and the reference surface 128 to control the flow. In some instances, the soft flow tube material may have a low pressure rating due to its low strength. A pressure containing member 130 is situated about at least a portion of the tube 126 to improve the pressure rating of the tube 126.

Many applications, such as those associated with the semiconductor, pharmaceutical, and bio-technology industries, require the flow path (all surfaces wetted by the process fluid) of fluid delivery systems be constructed of high purity, chemically inert/resistant, materials to protect the purity of the chemicals used. Plastics are desirable because the ultra pure chemicals used in the semiconductor wafer fabrication processes can be contaminated if metal ions are leached or removed from metal flow tubes due to a variety of mechanical and chemical processes. Plastic materials are corrosion resistant to a wide range of process materials. High purity grade plastics are thus used in these industries since this generally prevents transferring unwanted ions to the process material. In addition, the smooth surface finish inherent in the manufacturing of a plastic flow tube reduces the ability of bacteria to attach to the tube and contaminate the fluid with organic materials.

In such high purity applications, the tube 126 is preferably made of a high purity elastomer or plastic. A suitable high purity elastomer is silicone (cross-linked polysiloxane) as it is chemically resistant and has the proper chemical properties. Other suitable tubing materials are PVC (polyvinylchloride, Tygon), Polypropylene and Fluorocarbon Rubber (Viton). A variety of fluorinated polymers such PVDF and PTFE are also suitable. For example, PFA, a mixture including PFA materials, and silicone are suitable materials for the tube 126 in high purity applications. Moreover, in exemplary embodiments of the valve 100, there are no places where stagnant fluid can collect and no sliding or rubbing parts that could create particles in the fluid, making the disclosed design especially well suited for high purity applications.

The tube's flexibility allows the tubing walls to conform around any trapped particles or imperfections in the walls to provide a tight seal. The flow path is straight through, minimizing pressure drop and turbulence. The fluid contacts only the flow tube 126 preventing wear or corrosion of the other valve parts and preventing contamination of the process fluid in the case of high purity applications, such as semiconductor polishing operations.

Figure 2:
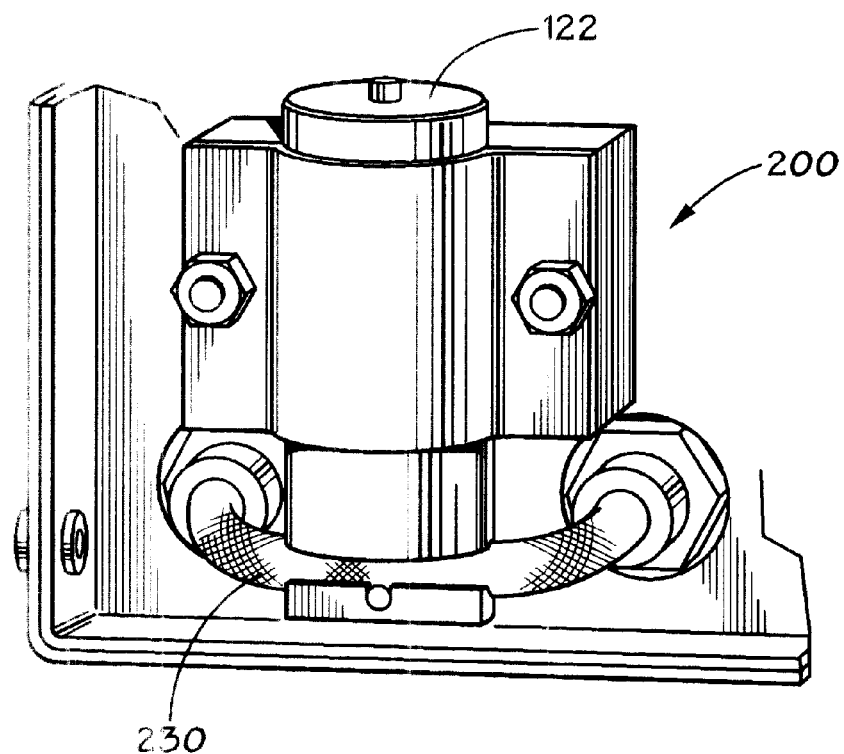
FIG. 2 pictorially illustrates a pinch valve including a braided sleeve pressure containing member in accordance with an embodiment of the invention.
Figure 3:
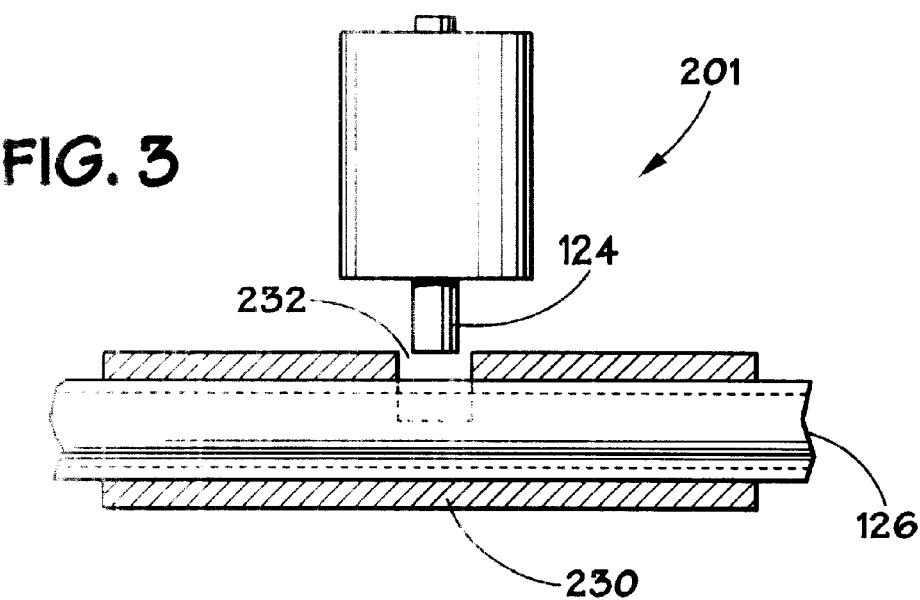
FIG. 3 conceptually illustrates a portion of the pinch valve shown in FIG. 3, with a portion of the braided sleeve removed.

FIG. 2 shows a pinch valve 200 in accordance with an embodiment of the present invention, in which the pressure containing member comprises a braided sleeve 230 surrounding the flow tube 126. In some embodiments, the braided sleeve surrounds the entire flow tube 126. FIG. 3 schematically illustrates portions of a pinch valve 201, in which a portion 232 of the braided sleeve 230 is removed. In the embodiment illustrated in FIG. 3, the removed portion 232 of the sleeve 230 is adjacent the valve plunger 124, so that the valve plunger 124 directly contacts the flow tube 126, rather than the pressure containing sleeve 230.

Generally, the braided sleeve 230 does not interfere with operation of the valve 201. Certain materials used for the braided sleeve 230, however, may take a permanent set if the valve plunger 126 is pushed against the sleeve material long enough to permanently deform the material. Such a deformed configuration of the sleeve may cause control problems. This type of deformation may occur, for example, with valves having a normally closed configuration, in which the plunger 126 compresses the flow tube 126 and sleeve 230 for long periods of time. Removing the portion 232 of the sleeve 230 in the illustrated location allows the plunger 126 to directly contact the flow tube 126, while maintaining the pressure containing properties of the braided sleeve 230. The sleeve material can be mechanically cut (scissors, cutters, etc.), thermally cut (to prevent unraveling of the material), etc. to achieve the desired opening geometry. Thus, the sleeve 230 acts as a "holder" for the tube 126. The sleeve 230 also offers pressure containment for the flow tube 126 and maintains an increased pressure rating of the portion of the flow tube 126 contained within the pinch valve body.

Figure 4:
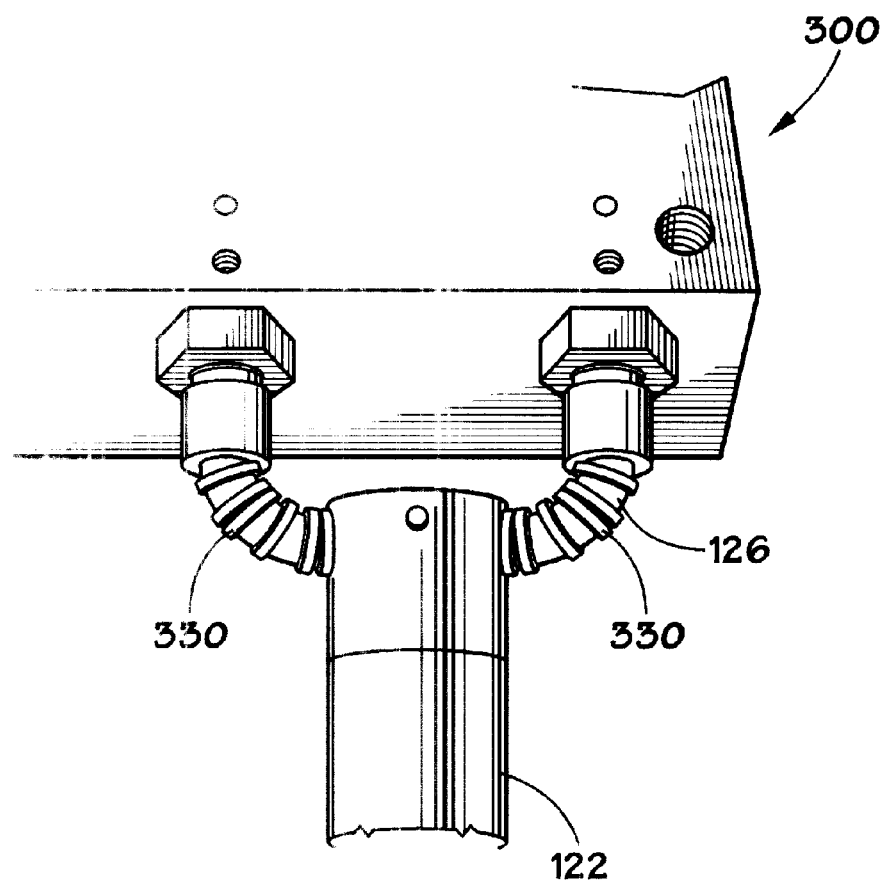
FIG. 4 pictorially illustrates a pinch valve including rings situated about the pinch tube for pressure retention in accordance with another embodiment of the invention.

FIG. 4 illustrates a pinch valve 300 in accordance with another exemplary embodiment of the invention. In the pinch valve 300, the pressure containing member comprises a plurality of rings 330 situated about the flow tube 126. In a particular embodiment, 1 mm wide polypropylene rings are spaced on the flow tube 126 on either side of the actuator 122.

In other embodiments, the pressure containing member comprises one or more rigid members situated about the flow tube 126. For example, the flow tube 126 may be inserted through a bore defined by such a rigid structure to provide pressure containment. In such an embodiment, the pressure containing member surrounds the flow tube. However, it is not essential that the entire tube be received by the pressure containing member. If more than half of the tube is surrounded, some pressure containment will be realized.

Figure 5:
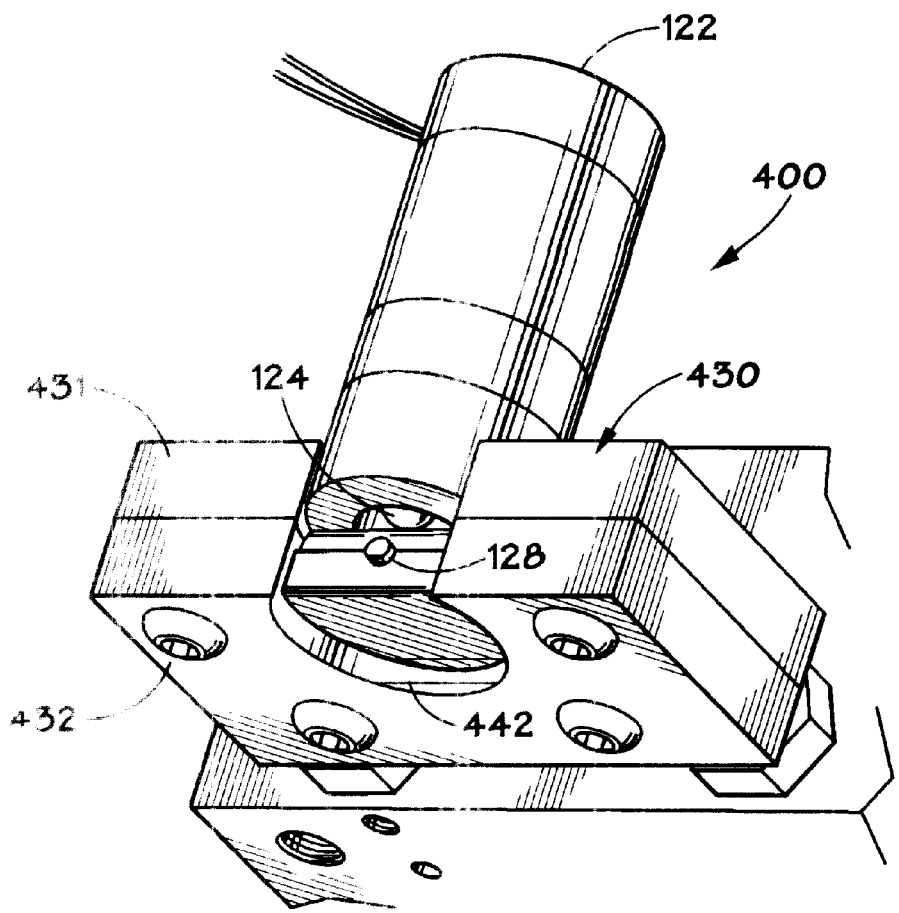
FIG. 5 pictorially illustrates a pinch valve including a clamshell pressure containing member in accordance with another embodiment of the invention.
Figure 6:
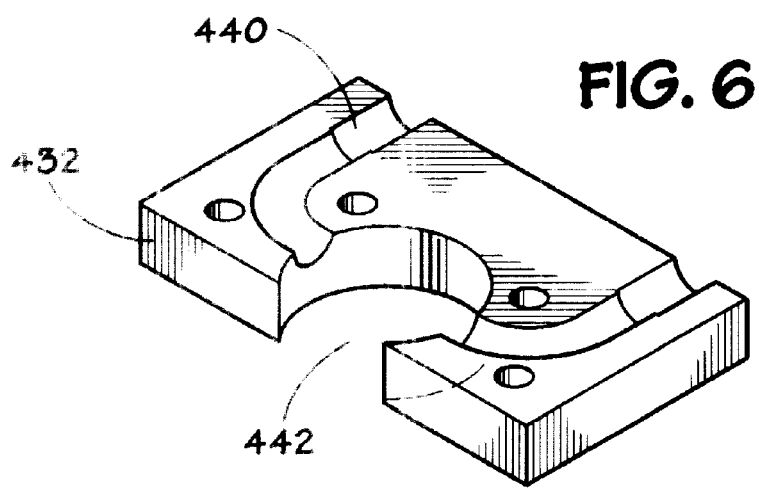
FIG. 6 is a perspective view of one portion of the clamshell pressure containing member shown in FIG. 5.
Figure 7:
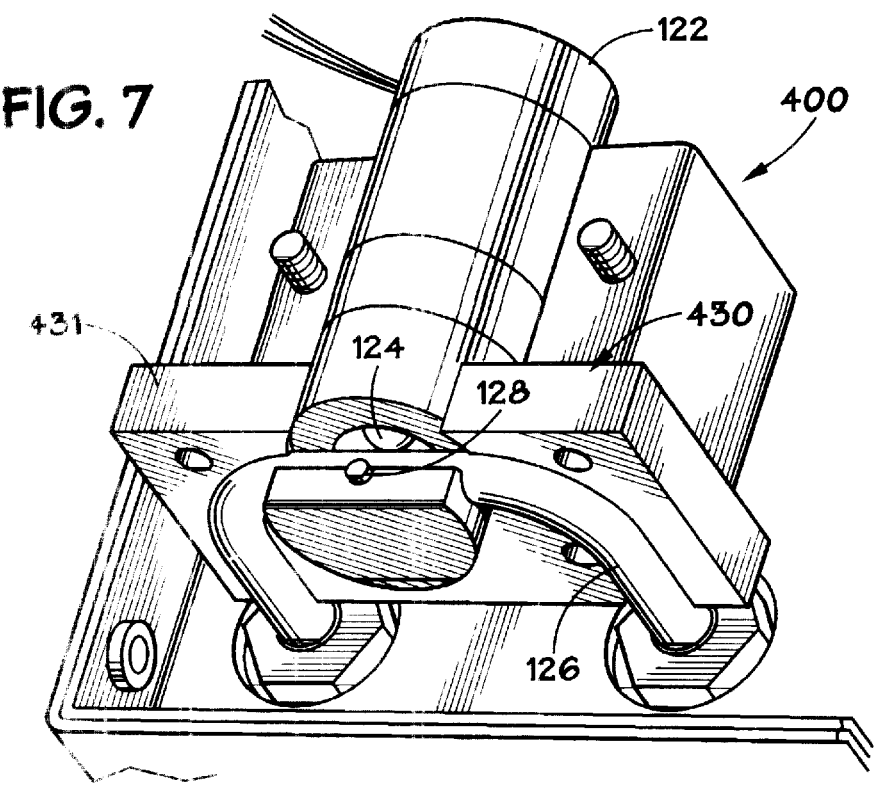
FIG. 7 shows the valve of FIG. 5 with a portion of the clamshell pressure containing member removed.

FIG. 5 shows a pinch valve 400 in accordance with an exemplary embodiment of the present invention that uses a rigid member including two pieces. The pinch valve 400 includes a clamshell pressure containing member 430 that includes upper and lower members 431, 432. FIG. 6 illustrates the lower member 432; the upper member 431 is similar. FIG. 7 shows the valve 400 with only the upper member 431 of the pressure containing member 430 in place. The upper and lower members 431,432 each define a groove 440 that generally corresponds to the shape of the flow tube 126, such that when the upper and lower members 431, 432 are sandwiched about the flow tube 126, the grooves 440 receive the flow tube 126 to provide pressure containment.

In the illustrated embodiment, the upper and lower members 431,432 further define an opening 442 that receives the lower portion of the actuator 122. The upper and lower members 431,432 are held together by any appropriate means to form the pressure containing member 430. In tests conducted on one embodiment using 0.25 inch silicone tubing for the pinch tube 126 with the clamshell pressure containing member 430, the pinch tube 126 did not burst until the pressure exceeded 200 psig. As noted above, the two-piece clamshell arrangement is exemplary; the rigid pressure containing member may comprise a single member, or several members.

The actuation of known pinch valves is usually bi-stable—on and off. Some known pinch valves have a manual actuator with a multi-turn handle, but this type of valve would not be conducive to closed loop flow control. Other pinch valves are used for dispensing applications in batch processes, in which the amount of material dispensed is controlled by the time that the valve is on. This does not allow dynamically controlling the flow rate in a continuous manner.

A valve that has only two states can be controlled by applying varying current or voltage to the valve actuator. In one embodiment, pulse width modulation (PWM) is used to control the valve. PWM is achieved by generating a square wave signal at a frequency above the valve's mechanical response frequency. The duty cycle of the signal is varied to determine the appropriate voltage or current sent to the device. For example, if the PWM signal operates between 0–12 volts, 0% duty cycle=0 volts, 50% duty cycle=6 volts, and 100% duty cycle=12 volts. The averaging takes place because the signal is at a frequency above the valve'mechanical response frequency. The position of the valve is based on the average current that is supplied. The resulting supply voltage is proportional to the pulse width of the signal.

If the signal frequency is too low, the valve will have time to respond completely to on and off signals creating a pulsed flow output, which is generally not desirable. A typical pinch valve actuator is a solenoid, which has a spring element with a preload adjustment that determines the current required to close the solenoid. Adjusting the pre-load on the valve spring can improve the valve's control range. In other implementations, the solenoid plunger element is replaced with a spring-suspended plunger. The spring-suspended plunger minimizes the non-linear valve response due to friction, which minimizes the hysteresis and dead band common in available solenoid-actuated pinch valves.

An alternative approach to the PWM-controlled solenoid is to use a stepper motor actuator, which translates a controlled, deterministic angular rotation to a linear ram drive by a worm gear type arrangement. Stepper controllers can be designed to produce a specific number of steps proportional to an analog signal input. Backlash, and thus valve hysteresis can be minimized by any number of appropriate worm gear designs that minimize backlash. A stepper motor generally provides immunity to temperature and pressure fluctuations, which may cause changes in the pinch tubing. A stepper motor is a means to control position, so the stepper is immune changes in the pinch tubing. With a pinch valve, the pinch tube is an integral part of the system—current is applied to the valve actuator, which applies force to the pinch tube, which pinches the tube. If the tube properties change due to temperature or pressure, the amount the tube closes, and thus the flow rate with a solenoid, changes. Moreover, a stepper actuator can remain at the last position to provide fast response to achieving setpoint at the start of a fluid delivery cycle.

Figure 8:
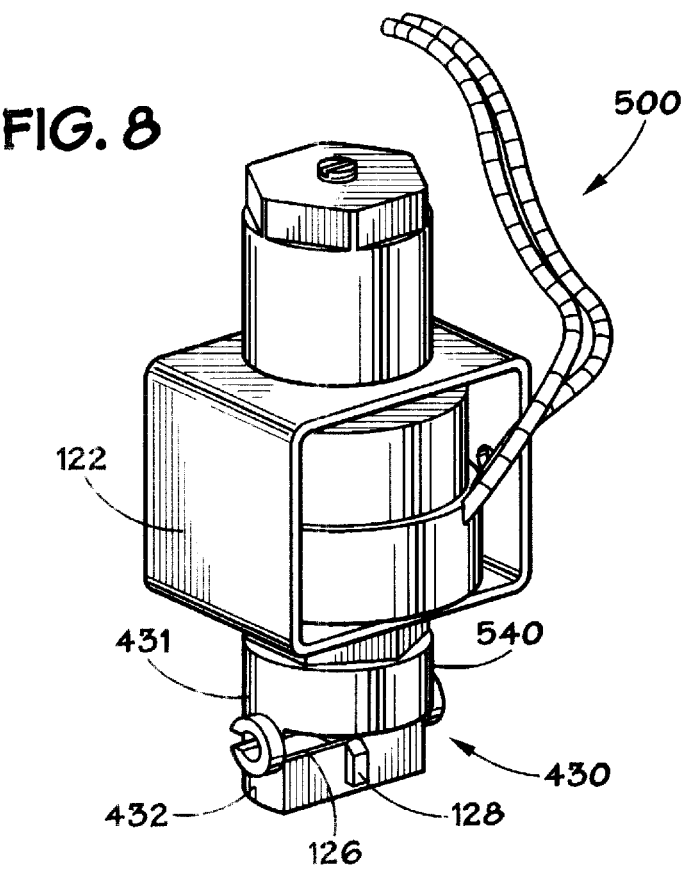
FIG. 8 is a perspective view of a pinch valve in accordance with another exemplary embodiment of the present invention.

A perspective view of control valve 500 in accordance with another exemplary embodiment of the present invention is shown in FIG. 8. The exemplary valve 500 is a solenoid-activated pinch valve. As with the other valves disclosed and illustrated herein, the valve 500 includes a plunger 124 (not shown in FIG. 8) received by an actuator 122 to selectively move a pinch member 502 (not shown in FIG. 8) that is situated adjacent an elastomeric flow tube 126. A reference surface 128 is positioned generally opposite the pinch member such that the elastomeric tube 126 is squeezable between the pinch member and the reference surface 128 to control fluid flow through the flow tube 126. The flow tube 126 is received in a pressure containing member 430 including upper and lower members 431,432 similar to that shown in FIGS. 5–7. In the valve 500, the upper member 431 is integral with a valve body 540. The reference surface 128 is received by the lower member 432. The exemplary valve 500 shown in FIG. 8 uses the clamshell pressure retaining member 430, though other pressure containing arrangements may be employed, such as those illustrated and described in conjunction with FIGS. 2–4 herein.

Figure 9:
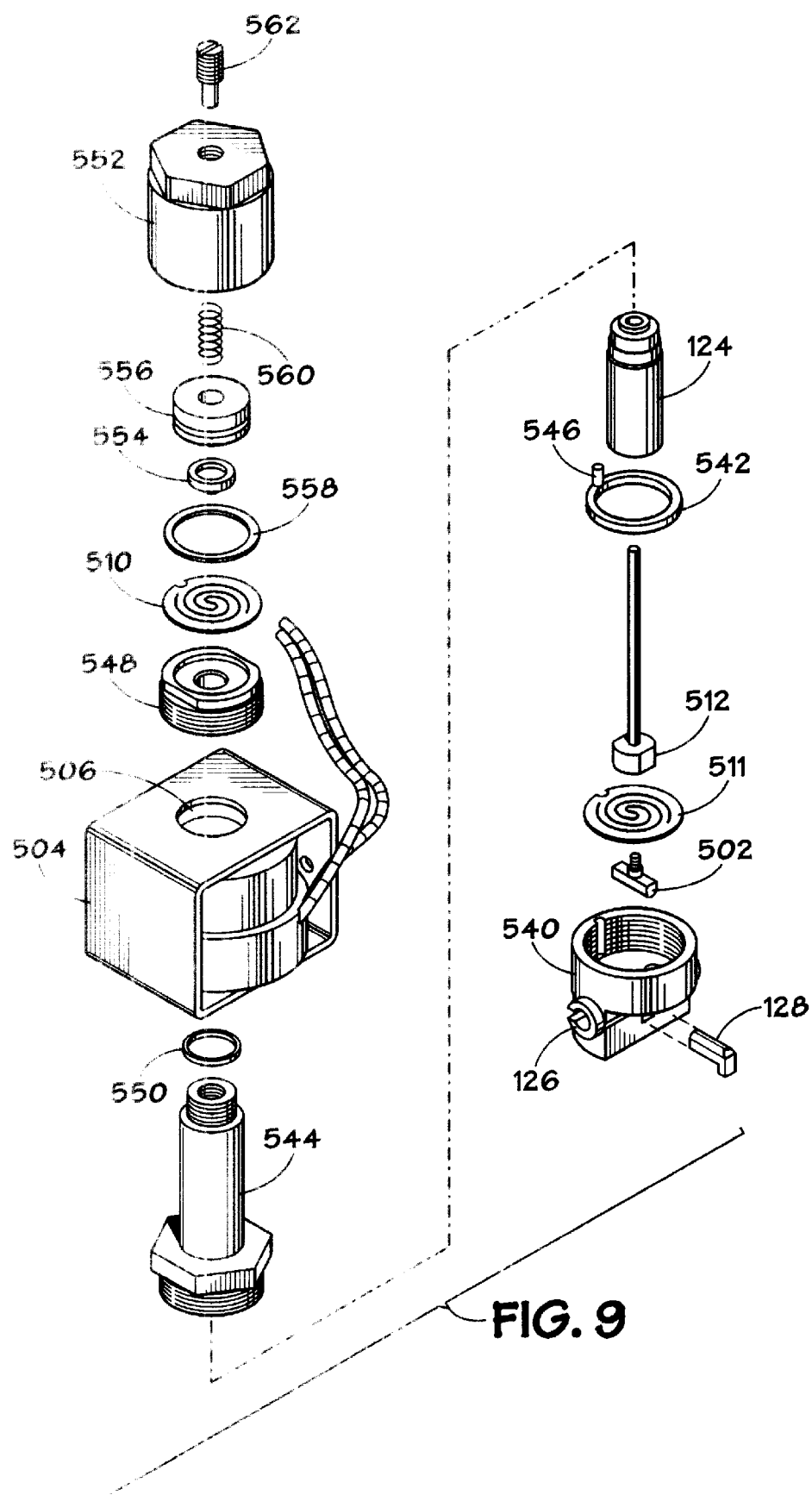
FIG. 9 is an exploded view of the pinch valve shown in FIG. 8.
Figure 10:
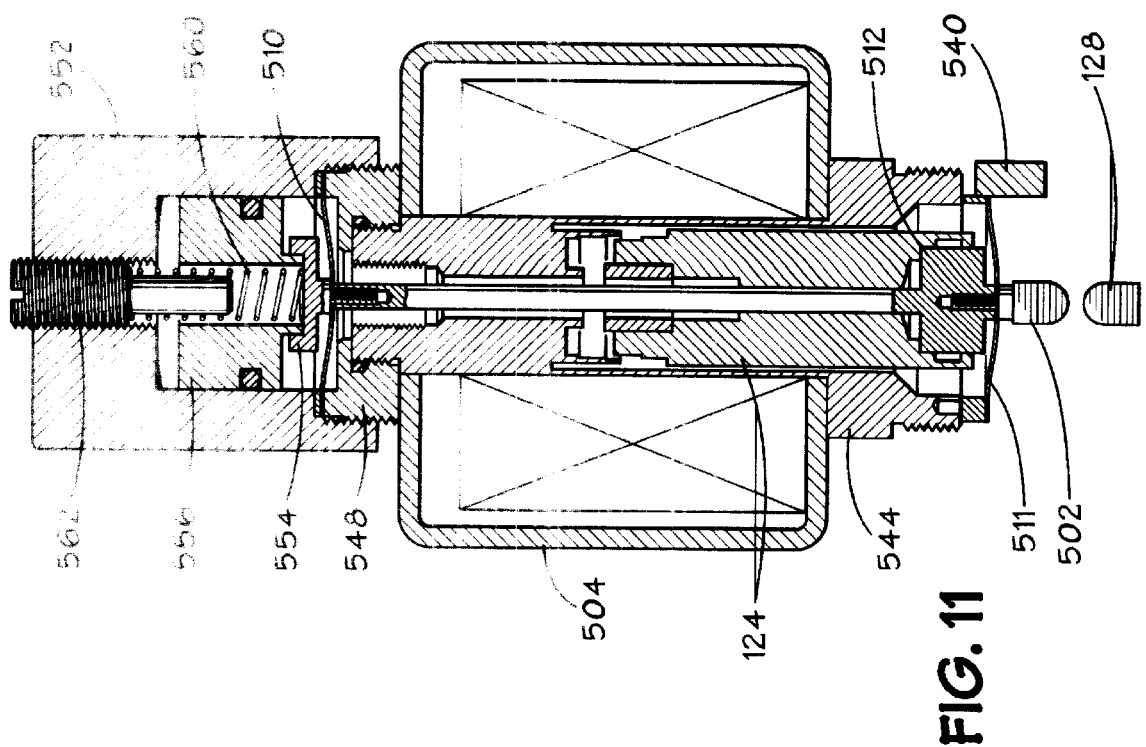
FIGS. 10 and 11 are sectional views of the pinch valve shown in FIGS. 8 and 9, showing the valve in a closed and open positions, respectively.
Figure 11:
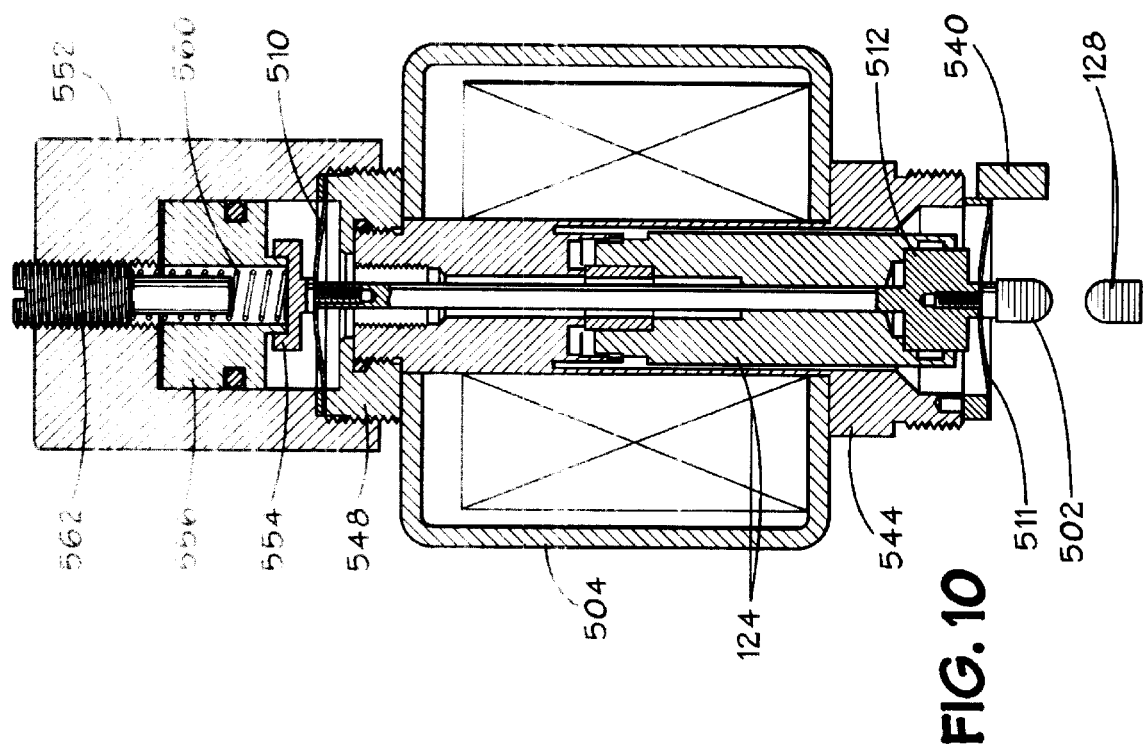
Figure 12:
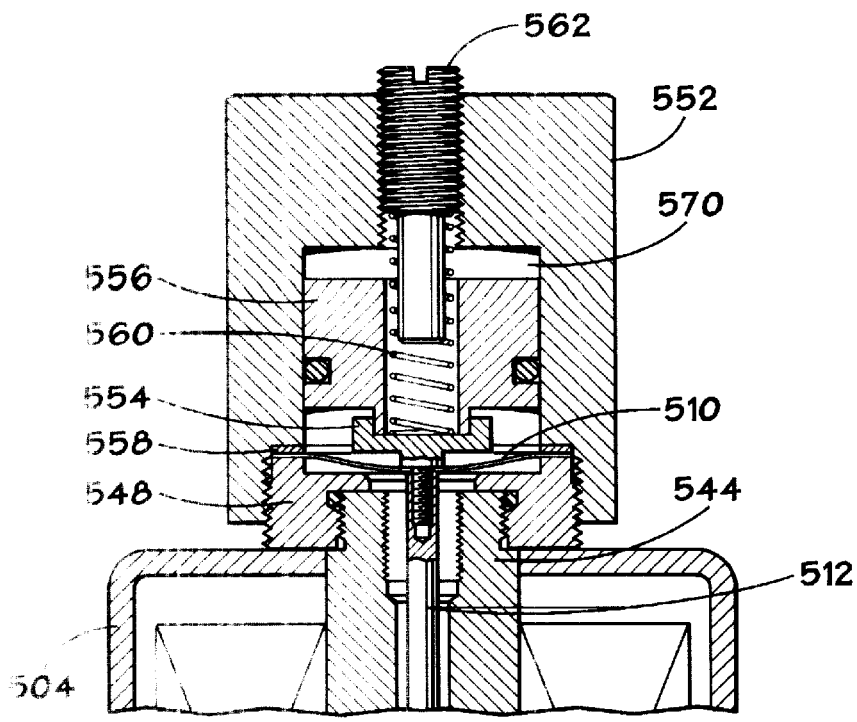
FIGS. 12 and 13 are sectional views illustrating the upper portion of the valve shown in FIGS. 10 and 11, respectively.

FIG. 9 is an exploded view of the control valve 500, and FIGS. 11 and 12 are sectional views showing the valve 500 in closed and open positions, respectively. The actuator 122 includes a solenoid yoke and coil assembly 504 defining an axial bore 506 therethrough. The valve 500 includes upper and lower guide springs 510,511 situated at opposite ends of a plunger 124.

In the illustrated embodiment, the pinch member 502 is connected to one end of the plunger 124 via a plunger extension 512. This allows both guide springs 510,511 to be of adequate diameter to deal with the required travel of the pinch valve without deforming. The guide springs 510,511 are flat disks with a series of spiral slots defined therein to make a spring that has high stiffness in the radial direction and low stiffness in the axial direction. The lower guide spring 511 fits into a counterbore in the valve body 540 that is concentric with the solenoid axis. The outer portion of the lower guide spring 511 is clamped between the valve body 540 and a spacer ring 542, which is in turn retained by a valve stem 544 received by the coil and yoke assembly bore 506. An alignment pin 546 maintains the pinch member bar 502 perpendicular to the pinch tube 126 during assembly. The guide springs keep the plunger 124 in the center of the valve stem 544, thus eliminating sliding friction between the plunger 124 and the valve stem 544.

In the illustrated embodiment, the pinch member 502 is situated on one side of the lower guide spring 511 and is attached to the plunger extension 512 situated on the opposite side of the lower guide spring 511. The plunger extension 512 is received by the plunger 124 such that the plunger 124 and plunger extension 512 become a rigid assembly. The plunger 124 and plunger extension 512 are received by the valve stem 544 such that the plunger extension 512 passes through the center of the valve stem 544. The valve stem 544 is retained in the coil and yoke assembly bore 506 via a yoke retainer 548 and a spacer ring 550. The yoke retainer 548 also provides a flat surface for clamping the upper guide spring 510 between the yoke retainer 548 and a top retainer 552.

A spring retainer 554 and spring cup 556 are situated on one side of the upper guide spring 510. The upper end of the plunger extension 512 is situated on the opposite side of the upper guide spring 510 and is connected to the spring retainer 554 to fasten the upper guide spring 510 to the plunger extension 512. An antifriction washer 558 is inserted between the top retainer 552 and the upper guide spring 510 to prevent twisting during assembly. A preload spring 560 is inserted through a bore in the top retainer 552 and rests in the spring cup 556. The amount of closing force exerted by the preload spring 560 is adjusted via an adjustor screw 562.

The effect of having the two guide springs 510,511 located on each end of the extended plunger 124,512 is to restrict its motion to always be on-axis with the valve stem 544, thus preventing any sliding contact between the moving pieces.

A long, slender preload spring is typically incorporated into traditional pinch valve designs. These springs will often buckle under normal load. To prevent this buckling of the spring, it is typically constrained in a hole. However, the spring will rub on the hole causing friction, which is undesirable to the valve operation. The preload spring 560 in the illustrated valve 500 is a relatively short spring that does not buckle and does not need to be supported in a hole. This eliminates the undesirable friction from this component.

Since many sources of friction associated with prior art valves have been removed in the disclosed valve 500, the valve may be more prone to self-induced oscillations resulting from the fluid flow. The friction of the solenoid motion would normally damp such oscillations. The exemplary valve 500 includes a damper that stops these oscillations without adding friction to the system.

Figure 13:
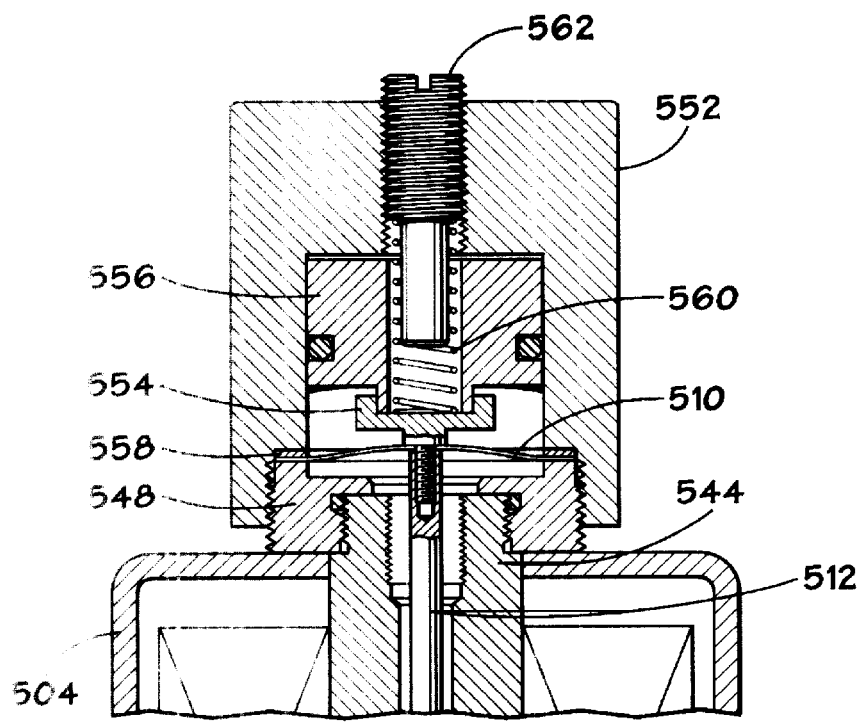

FIGS. 12 and 13 show the upper portion of the valve 500 in closed and open positions, respectively. The spring cup 556 is received in the top retainer 552 such that there is a small clearance therebetween (the diameter of the spring cup 556 is smaller than the diameter of the bore in the top retainer 552 receiving the spring cup 556). The top retainer 552, spring cup 556 and spring retainer 554 thus function as a damper to reduce or preventing oscillations. As shown in FIG. 12, air is trapped in the space 570 above the spring cup 556. When the valve stem 544 moves, the spring cup 556 slides in the top retainer 552. When the spring cup 556 slides upwards from the position shown in FIG. 12 to the position shown in FIG. 13, the area of the space 570 is reduced so the trapped air must pass through this small clearance, creating a pressure differential that resists the motion of the valve stem 544. The resisting force is only present when the valve stem 544 is moving, and thus does not affect the fine control characteristics of the valve 500, since it is only required to move relatively slowly (about 1 Hz). The resisting force also goes up sharply with the speed of the motion, and thus is an effective damper at high speeds (>10 Hz).

Figure 14:
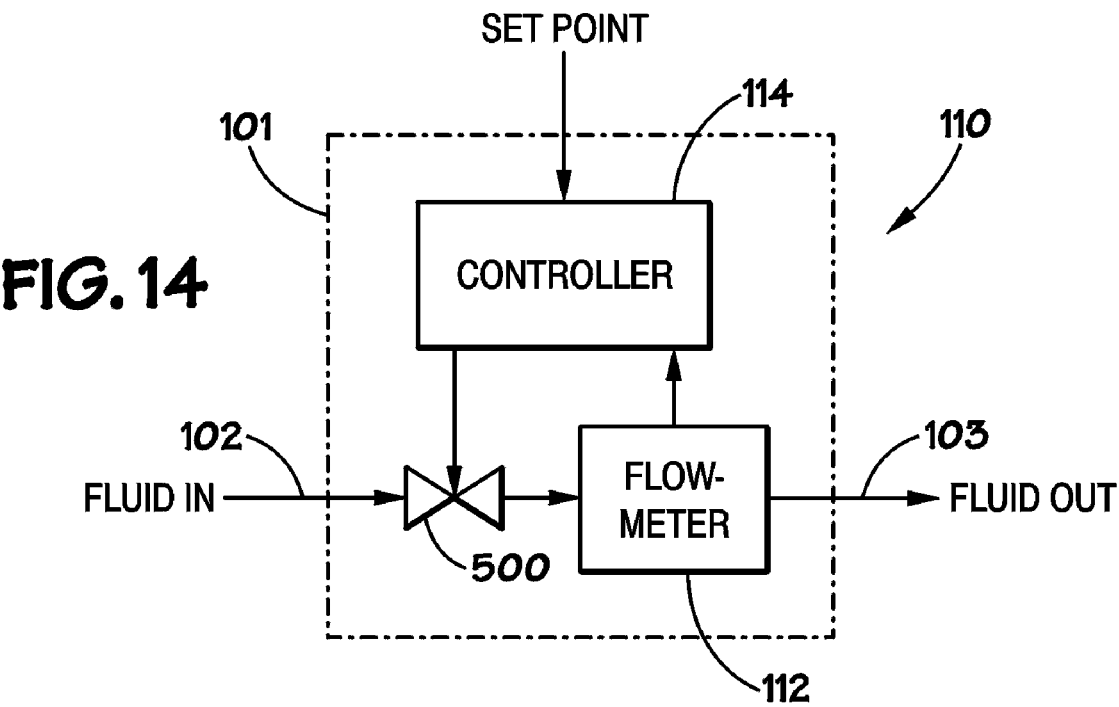
FIGS. 14 and 15 are block diagrams illustrating flow measurement and control devices employing a pinch valve in accordance with an exemplary embodiment of the invention.
Figure 15:
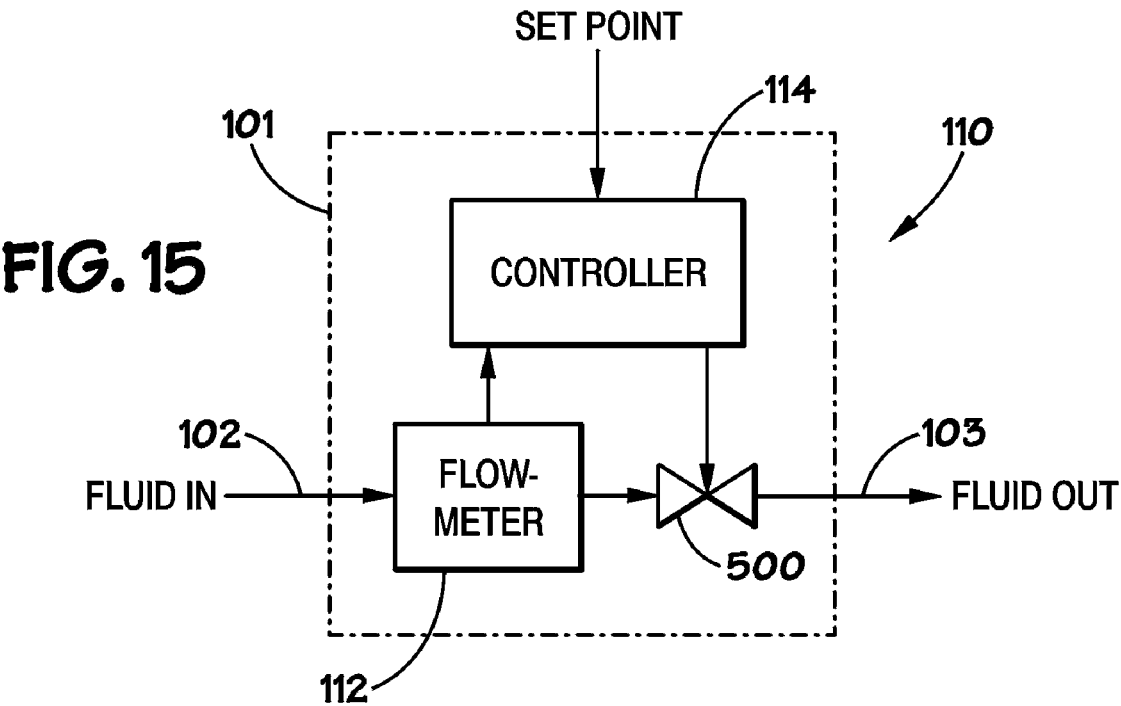

FIGS. 14 and 15 schematically illustrate a flow measurement and control device 110 employing a pinch valve such as the pinch valve 500 disclosed and illustrated herein. The measurement and control device 110 includes an enclosure 101 having a fluid inlet and outlet 102, 103. A flow measurement device 112 is situated in the enclosure 101. In an exemplary embodiment, the flow measurement device 112 comprises a Coriolis mass flowmeter.

In high-purity applications, the flowmeter 112 preferably has a flow-tube made of a high-purity plastic material to prevent contamination of the process fluid caused by transferring unwanted (e.g. metal) ions to the process material. Suitable high purity plastic materials include PFA, PVDF and PTFE. As noted herein above, the pinch valve 500 may also include components made of a high purity plastic material to prevent transferring ions to the process material. In the block diagram of FIG. 14, the valve 500 is shown as being situated completely within the enclosure 101. In some embodiments, portions of the valve, or the entire valve, are attached to an outside surface of the enclosure 101, as in the embodiments shown in FIGS. 2, 4 and 5.

A controller 114 receives a setpoint signal and an output signal from the flowmeter 112. The controller 114 conditions and processes the signal from the flow meter and outputs a control signal to the pinch valve 500 to vary the flow rate of the process material based on a comparison of the setpoint and measured flow rate. The setpoint input to the controller 114 is typically an electronic signal such as a 0–5V, 4–20 mA signal or a digital signal. A pneumatic setpoint interface could also be used. A suitable setpoint generator is a model P48 process controller available from Red Lion Controls of York, Pa.

The controller 114 may also have a feature commonly known as valve override, where an additional signal is sent to the controller 114. This override signal causes the controller 114 to ignore the setpoint and fully open or close the valve 500. This feature is often used for shutting the flow off or purging the system. In FIG. 14, the controller 114 is shown as being positioned inside the enclosure 101, providing a completely integrated flow control system. In other embodiments, however, the controller 114 is external to the enclosure 101.

The pinch valve 500 regulates the flow through the device 110, and it also provides a buffer against changes in line pressure. The valve 500 can be positioned either upstream of the mass flowmeter 112 as shown in FIG. 14, or downstream as in the embodiment shown in FIG. 14. Generally, it is preferable to have the valve 500 on the side that will see the largest pressure variations during use. This helps shelter the flow meter 112 from pressure changes and fluctuations.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A control valve, comprising:
    an elastomeric flow tube;
    a plunger having first and second ends;
    a pinch member connected to the first end of the plunger, the pinch member situated adjacent the flow tube;
    a reference surface positioned generally opposite the pinch member such that the elastomeric tube is squeezable between the pinch member and the reference surface to control fluid flow through the flow tube;
    a first guide spring situated between the pinch member and the first end of the plunger; and
    a second guide spring situated adjacent the second end of the plunger.

2. The control valve of claim 1, further comprising an actuator receiving the plunger to adjust the plunger to selectively position the pinch member relative to the reference surface.

3. The control valve of claim 1, further comprising a plunger extension having first and second ends, the plunger extension received by the plunger, the first end of the plunger extension extending from the first end of the plunger and abutting a first side of the first guide spring.

4. The control valve of claim 3, wherein the pinch member is attached to the first end of the plunger extension and is situated adjacent a second side of the first guide spring opposite the first side.

5. The control valve of claim 1, further comprising a plunger extension having first and second ends, the plunger extension received by the plunger, the second end of the plunger extension extending from the second end of the plunger and abutting a first side of the second guide spring.

6. The control valve of claim 1, wherein a damper is connected to the second end of the plunger.

7. The control valve of claim 6, wherein the damper includes a first member defining an opening therein and a second member slidably received in the opening such that there is clearance between the first and second members to create an air passage.

8. The control valve of claim 6, wherein the damper is situated adjacent a second side of the second guide spring opposite a first side of the second guide spring.

9. The control valve of claim 5, further comprising:
    a spring cup defining an opening therethrough;
    a spring retainer having a first side adjacent an end of the spring cup opening and a second side and abutting a second side of the second guide spring opposite the first side of the second guide spring; and
    a preload spring received by the spring cup opening and seated in the spring retainer.

10. The control valve of claim 9, wherein the spring cup is attached to the second end of the plunger extension.

11. The control valve of claim 1, wherein the first guide spring comprises a flat disk defining a spiral slot therethrough.

12. The control valve of claim 1, wherein the second guide spring comprises a flat disk defining a spiral slot therethrough.

13. The control valve of claim 2, wherein the actuator includes a valve stem receiving the plunger.

14. The control valve of claim 13, wherein the first guide spring is clamped between a first end of the actuator and a first end of the valve stem.

15. The control valve of claim 1, further comprising a pressure containing member situated about at least a portion of the flow tube.

16. The control valve of claim 15, wherein the pressure containing member comprises a braided sleeve.

17. The control valve of claim 15, wherein the pressure containing member comprises a plurality of rings.

18. The control valve of claim 15, wherein the pressure containing member comprises a rigid member receiving at least a portion of the flow tube.

19. The control valve of claim 18, wherein the rigid member comprises first and second members sandwiched about the flow tube.

20. A flow measurement and control device, comprising:
an enclosure;
a flow measurement device situated in the enclosure;
an elastomeric flow tube in fluid communication with the flow measurement device;
a plunger having first and second ends;
a pinch member connected to the first end of the plunger, the pinch member situated adjacent the flow tube;
a reference surface positioned generally opposite the pinch member such that the elastomeric tube is squeezable between the pinch member and the reference surface to control fluid flow through the flow tube;
a first guide spring situated between the pinch member and the first end of the plunger; and
a second guide spring situated adjacent the second end of the plunger.

21. The flow measurement and control device of claim 20, wherein the flow measurement device is a Coriolis mass flow measurement device.

22. The flow measurement and control device of claim 20, further comprising:

an actuator receiving the plunger to adjust the plunger to selectively position the pinch member relative to the reference surface; and a controller receiving a measurement output signal from the flow measurement device, the controller providing a control output signal to the pinch valve actuator in response to a setpoint signal and the measurement output signal.

23. The flow measurement and control device of claim 20, wherein the elastomeric flow tube, the plunger, the pinch member, the reference surface, and the first and second guide tubes are situated in the enclosure.

24. The flow measurement and control device of claim 20, further comprising a damper connected to the second end of the plunger.

25. The flow measurement and control device of claim 20, further comprising a pressure containing member situated about at least a portion of the flow tube.

* * * * *